(12) United States Patent
Rieger et al.

(10) Patent No.: US 7,102,250 B2
(45) Date of Patent: Sep. 5, 2006

(54) THREE-PHASE GENERATOR HAVING INCREASED OUTPUT

(75) Inventors: Reinhard Rieger, Brackenheim (DE); Klaus Beulich, Sachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 10 days.

(21) Appl. No.: 10/492,234

(22) PCT Filed: Oct. 2, 2002

(86) PCT No.: PCT/DE02/03795

§ 371 (c)(1),
(2), (4) Date: Oct. 19, 2004

(87) PCT Pub. No.: WO03/034583

PCT Pub. Date: Apr. 24, 2003

(65) Prior Publication Data

US 2005/0041344 A1    Feb. 24, 2005

(30) Foreign Application Priority Data

Oct. 11, 2001   (DE) .............................. 101 50 373

(51) Int. Cl.
*B60L 1/00*   (2006.01)

(52) U.S. Cl. ....................................... 307/10.1; 361/20
(58) Field of Classification Search ................. 307/10.1
See application file for complete search history.

(56) References Cited

U.S. PATENT DOCUMENTS

| | | | |
|---|---|---|---|
| 4,092,712 A * | 5/1978 | Harrigill et al. | ............... 363/60 |
| 4,389,703 A | 6/1983 | Morel et al. | |
| 5,986,439 A * | 11/1999 | Pletta et al. | .................. 322/59 |
| 6,272,031 B1 | 8/2001 | Shona | |

FOREIGN PATENT DOCUMENTS

| DE | 196 34 096 | 2/1998 |
|---|---|---|
| EP | 0 325 454 | 7/1989 |

* cited by examiner

*Primary Examiner*—Stephen W. Jackson
*Assistant Examiner*—Carlos Amaya
(74) *Attorney, Agent, or Firm*—Kenyon & Kenyon LLP

(57) ABSTRACT

A three-phase generator that has a plurality of stator windings, a rectifier system connected with the stator windings, an exciter winding, a generator controller, and an additional circuit that effects an increase in voltage. This additional circuit is a passively operated booster circuit that is integrated into the generator and that has no controlled components.

3 Claims, 4 Drawing Sheets

THREE-PHASE GENERATOR HAVING INCREASED OUTPUT

BACKGROUND INFORMATION

In known claw-pole generators, the energy for the excitation is taken from the electrical system of the respective motor vehicle. This takes place using a generator controller that has a switched semiconductor as a switching element. The generator controller sets the excitation voltage between 0 V and the electrical system voltage. This is shown in FIG. 1, which depicts a diagram illustrating the positioning of generator controller R between electrical system BN and excitation winding WE of the generator.

FIG. 2 shows a known generator circuit having a generator controller R, an excitation winding WE, a rectifier system G and three stator windings WS. The stator windings form a star connection, and are offset by 120° from one another with respect to the rotor (not shown). The beginnings of the windings, which are connected to the rectifier system, are designated with the letters U, V, W. When the rotor is turned, an alternating voltage is produced in each of these stator windings. The three alternating voltages produced are offset from one another by 120°.

From German Published Patent Application No. 196 34 096, a voltage supply system is known that has an increased output power, produced when an increased power requirement is signaled by an external control signal. The known system has a three-phase generator whose windings supply the voltage for a vehicle electrical system via rectifiers. In addition, the generator contains an exciter winding through which the excitation voltage, which can be influenced by a voltage controller, flows. The exciter winding can be operated with a voltage that is higher than the supply voltage during times that can be predetermined. This increased voltage is produced through the activation of additional windings having rectifiers in the generator, or by a direct-current converter allocated to the generator. In this way, the controlling of the generator takes place through the voltage controller, which has controlled transistors, in such a way that the output voltage of the generator remains at the level of the electrical system.

SUMMARY OF THE INVENTION

In contrast, the present invention achieves an increased output power of the generator by using, as an improved magnetic utilization of the generator, the ripple at the exciter winding ends in order to achieve a capacitive voltage increase. This takes place economically through the use of a passive additional circuit that has no transistors. In comparison with circuit topologies that, for example, use direct-current converters for voltage multiplication, this results in advantages with respect to the electromagnetic compatibility.

In comparison to all actively controlled additional circuits, advantages result the fact that no actively controlled components are required. Conventional diodes and capacitors can be used. In addition, no saturation effects occur. The additional circuit according to the present invention is secure against short-circuiting and against open-circuit operation.

An additional voltage increase can advantageously be achieved through the use of a cascade connection.

DETAILED DESCRIPTION

According to the present invention, an additional circuit that uses only passive components is inserted into a three-phase generator, preferably a claw-pole generator, and through the use of said circuit an increase is achieved in the excitation voltage drop at the excitation winding of the generator. In this way, the excitation current flowing through the excitation winding, and thus the output power provided by the generator, are also increased.

With an additional circuit according to the present invention, the output voltage of the generator can for example be doubled or tripled. A further increase of the output voltage of the generator is possible through the additional use of a cascade connection.

Figure 1:
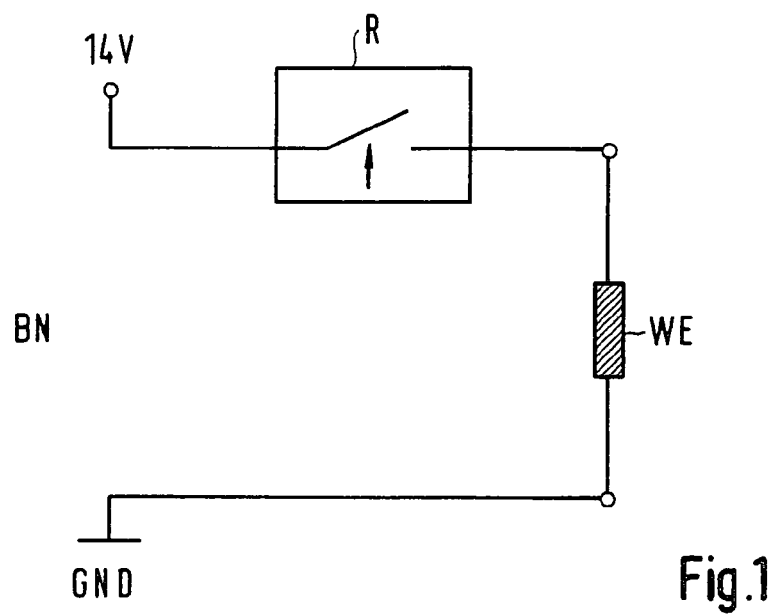
FIG. 1 shows an arrangement including a generator controller.
Figure 2:
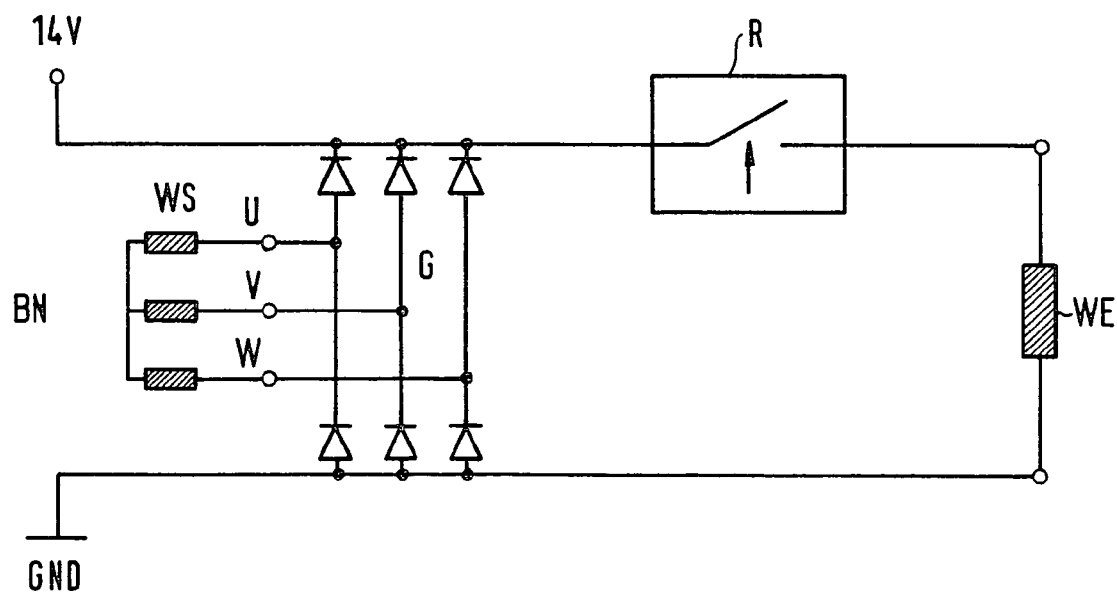
FIG. 2 shows a generator circuit provided with a generator controller.
Figure 3:
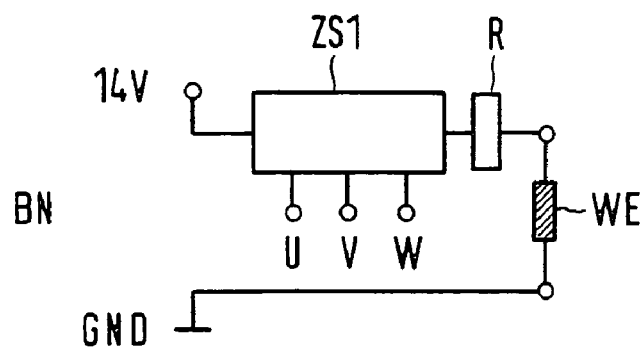
FIG. 3 shows a drawing illustrating the arrangement of the additional circuit according to a first exemplary embodiment of the present invention.

FIG. 3 shows a drawing illustrating the arrangement of an additional circuit according to a first exemplary embodiment of the present invention. In this first exemplary embodiment, one terminal of additional circuit ZS1 is connected with the 14V electrical system, and a second terminal is connected, via generator controller R, to the terminal away from ground of excitation winding WE. The other terminal of excitation winding WE is connected directly to ground GND. In addition, additional circuit ZS1 has terminals U, V, W, that are connected to the stator windings.

Figure 4:
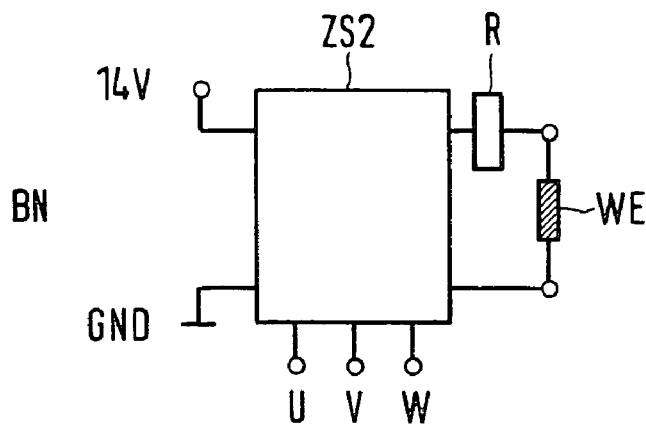
FIG. 4 shows a drawing illustrating the arrangement of the additional circuit according to a second exemplary embodiment of the present invention.

FIG. 4 shows a drawing illustrating the arrangement of an additional circuit according to a second exemplary embodiment of the present invention. In the second exemplary embodiment, a terminal of additional circuit ZS2 is connected to the 14V electrical system, and a second terminal is connected, via generator controller R, to the terminal away from ground of excitation winding WE. In addition, additional circuit ZS2 also extends to the connection between the terminal adjacent to ground of excitation winding WE and ground GND. In addition, additional circuit ZS2 has terminals U, V, W that are connected to the stator windings.

Figure 5:
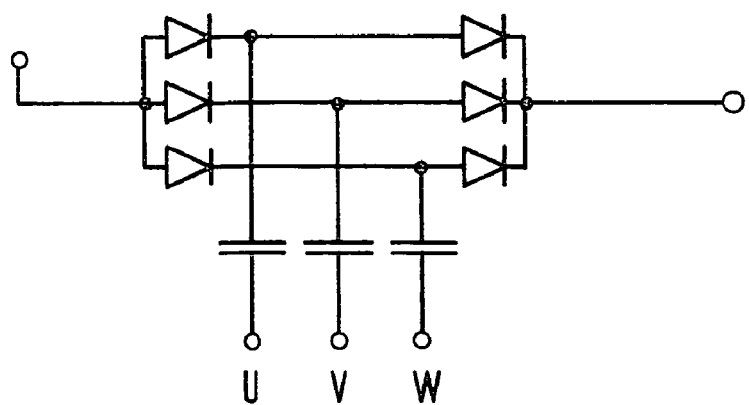
FIG. 5 shows an exemplary embodiment of an additional circuit according to the present invention.

FIG. 5 shows an exemplary embodiment of an additional circuit ZS1 that can be used in combination with FIG. 3. This additional circuit is a passively operated booster circuit situated between the 14V terminal and generator controller R according to FIG. 3. This booster circuit has a parallel circuit of three signal branches, each signal branch containing two diodes connected in series. The connection point between the two diodes of the first signal branch can be connected with terminal U via a capacitor. The connection point between the two diodes of the second signal branch can be connected with terminal V via a capacitor. The connection point between the two diodes of the third signal branch can be connected with terminal W via a capacitor.

In alternative exemplary embodiments, not shown in the drawing, the additional circuit has only one parallel circuit having two signal branches, or simply has only one signal branch, each of these signal branches being constructed in the same way as one of the signal branches shown in FIG. 5.

Figure 6:
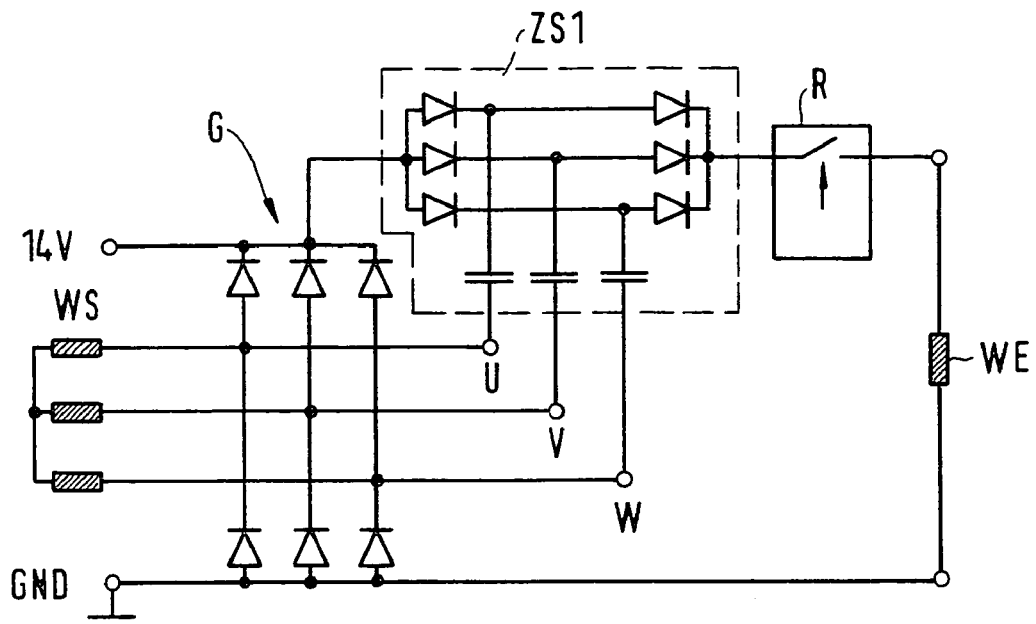
FIG. 6 shows a first exemplary embodiment of a generator circuit according to the present invention.

If a booster circuit according to FIG. 5 is used in a claw-pole generator, there results the device shown in FIG. 6, which shows a first exemplary embodiment of a generator circuit according to the present invention.

Figure 7:
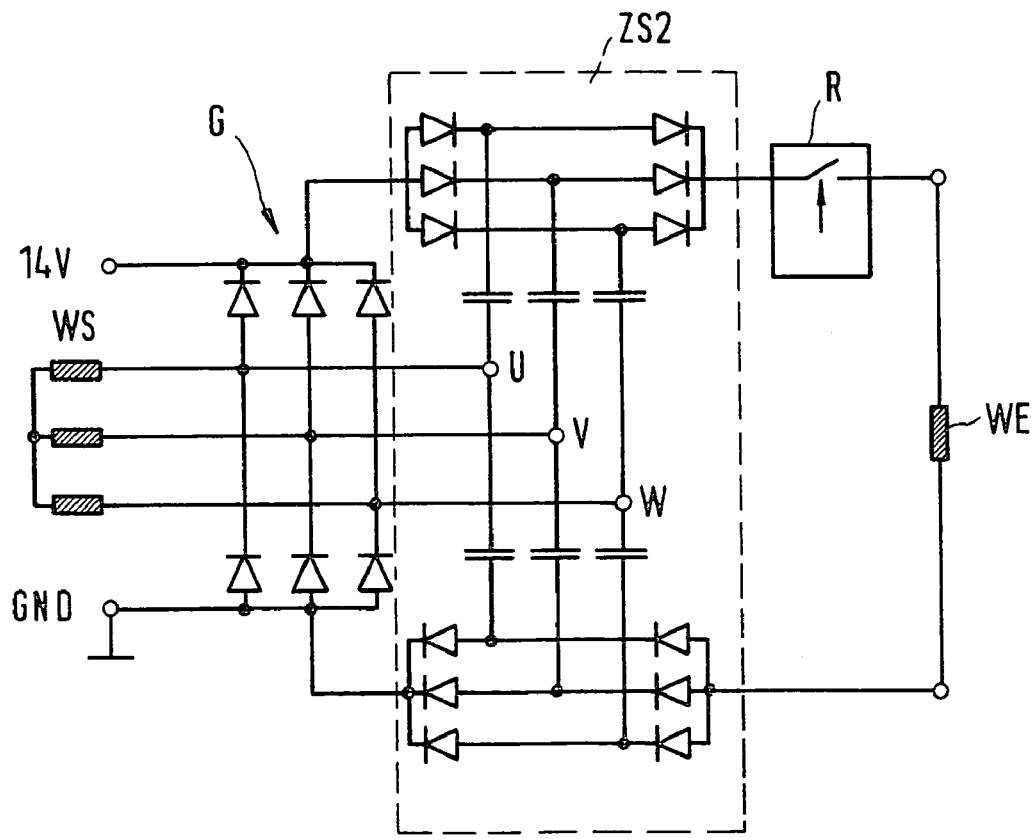
FIG. 7 shows a second exemplary embodiment of a generator circuit according to the present invention.

In addition, if such a booster circuit is additionally placed into the connection branch between the terminal adjacent to ground of excitation winding WE and ground, there results the device shown in FIG. 7, which shows a second exemplary embodiment of a generator circuit according to the present invention. This exemplary embodiment is based on the schematic design according to FIG. 4.

Figure 8:
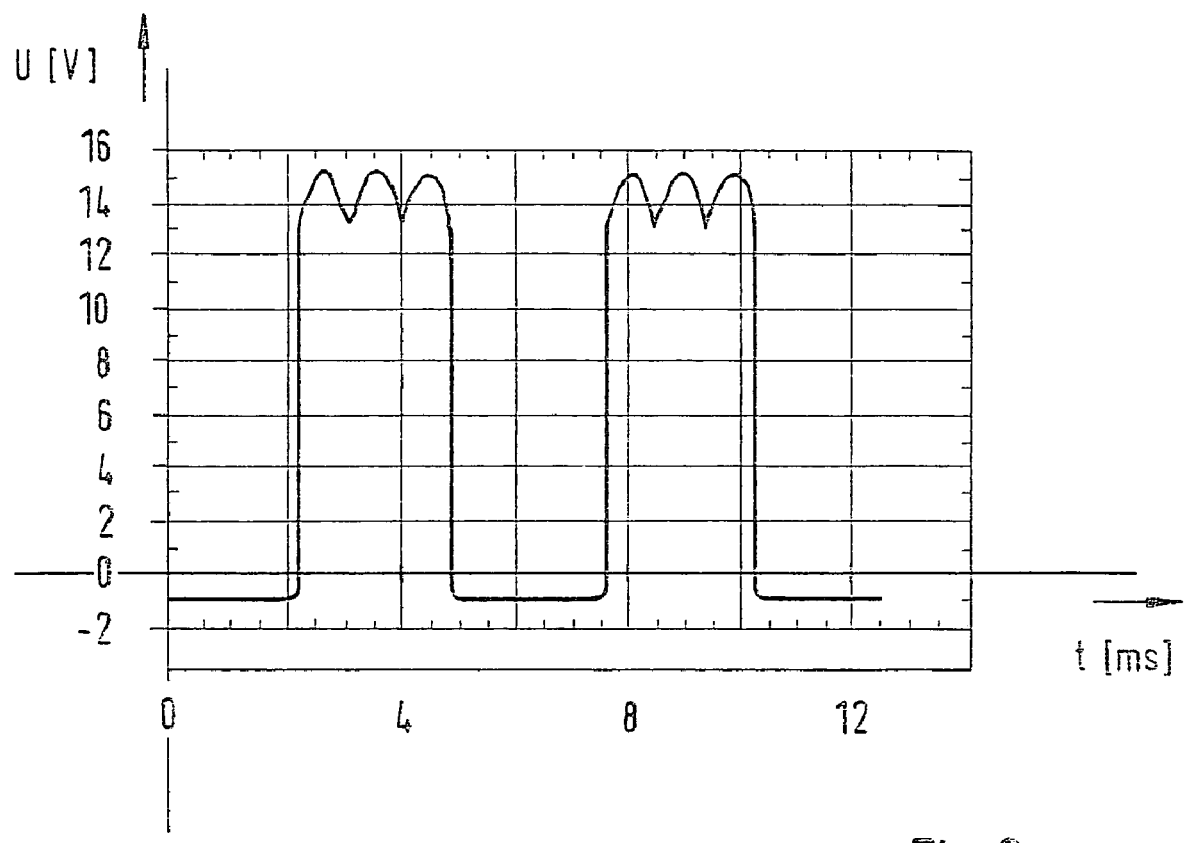
FIG. 8 shows a diagram illustrating the voltage curves at the winding taps of the stator windings.

The curve of the winding voltages at taps U, V, W is shown in FIG. 8 for one of these winding phases. In this Figure, time is plotted on the abscissa and voltage is plotted on the ordinate. It can be seen that the winding voltages run in approximately rectangular fashion.

In the following, the functioning of the voltage increase circuit in the exemplary embodiment according to FIG. 6 is explained in more detail on the basis of one phase of the three-phase generator. First, a voltage of −0.7 V is present at tap U. This is because this tap U is connected with ground GND via a diode, this diode having a forward voltage of 0.7 V.

A voltage of 14V is present at the capacitor situated in the U phase, said capacitor being connected to the electrical system via a diode of the additional circuit. A flow of current takes place from the electrical system to the capacitor via the diode. In this way, the potential at tap U increases to a value that corresponds to the sum of the electrical system voltage and the forward voltage of the diode, i.e., to a value ($U_{BN}$+0.7 V). This corresponds to an increase in the charge of the capacitor.

Subsequently, charge flows from the capacitor into the exciter circuit via the second diode of the additional circuit. In this way, the potential at tap U sinks again to −0.7 V. This process, which is constantly repeated, takes place in each of phases U, V, W, with a time offset of 120°.

For example, let exciter current $I_{err}$=8 A and let exciter voltage $U_{err}$=24V. The energy output of the capacitor is then calculated as $$E = \frac{1}{2} C[(2 \cdot U_{14})^2 - (U_{err} - U_{14})^2]$$

For the power of the booster circuit, the following holds:

$$P = f_{el} \cdot \frac{3}{2} \cdot C[(2 \cdot U_{14})^2 - (U_{err} - U_{14})^2]$$

In this way, the following is obtained:

C≈1500 μF, if f=180 Hz.

If the boundary conditions change, different values will result.

What is claimed is:

1. A three-phase generator, comprising:
   a plurality of stator windings;
   a rectifier system connected to the stator windings;
   an exciter winding;
   a generator controller; and
   an additional circuit that effects an increase in voltage, wherein:
   the additional circuit includes a passively operated booster circuit that is integrated into the generator and that has no controlled components;
   the additional circuit includes only diodes and capacitors; and
   the additional circuit is connected between a vehicle electrical system and a terminal away from ground of the exciter winding.

2. The three-phase generator as recited in claim 1, wherein:
   the additional circuit has one, two, or three signal branches, each signal branch containing two diodes connected in series, and each connection point between the two diodes being connected, via a capacitor, with one of the stator windings.

3. A three-phase generator, comprising:
   a plurality of stator windings;
   a rectifier system connected to the stator windings;
   an exciter winding;
   a generator controller; and
   an additional circuit that effects an increase in voltage, wherein:
   the additional circuit includes a passively operated booster circuit that is integrated into the generator and that has no controlled components;
   the additional circuit includes two parallel circuits,
   each parallel circuit includes three signal branches,
   each signal branch includes two diodes connected in series,
   each connection point between the two diodes is connected with one of the stator windings via a capacitor,
   one of the parallel circuits is connected between a vehicle electrical system and a terminal away from ground of the exciter winding, and
   another one of the parallel circuits is connected between a terminal adjacent to ground of the exciter winding and ground.

* * * * *